United States Patent
McFadden et al.

(10) Patent No.: US 8,026,846 B2
(45) Date of Patent: Sep. 27, 2011

(54) MOBILE RADIATION SURVEILLANCE NETWORK

(75) Inventors: Robert Cassin McFadden, Loretto (CA); Shannon Dinesh Lal, Ottawa (CA); Christopher James McInnis Clarke, Toronto (CA)

(73) Assignees: Mobile Detect Inc., Bolton (CA); Robert Cassin McFadden, Adjala Township (CA); Christopher James McInnis Clarke, Toronto (CA)

( * ) Notice: Subject to any disclaimer, the term of this patent is extended or adjusted under 35 U.S.C. 154(b) by 0 days.

(21) Appl. No.: 12/172,136

(22) Filed: Jul. 11, 2008

(65) Prior Publication Data

US 2009/0033487 A1 Feb. 5, 2009

Related U.S. Application Data

(63) Continuation of application No. 11/669,588, filed on Jan. 31, 2007, now abandoned, which is a continuation of application No. 10/867,643, filed on Jun. 16, 2004, now abandoned.

(60) Provisional application No. 60/520,243, filed on Nov. 17, 2003.

(51) Int. Cl.
*G01S 19/17* (2010.01)
*G08B 1/08* (2006.01)
*G08B 21/00* (2006.01)

(52) U.S. Cl. ............... 342/357.55; 340/539.26; 340/540

(58) Field of Classification Search ............ 342/357.07, 342/357.09, 357.1, 357.55; 340/539.26, 340/540
See application file for complete search history.

(56) References Cited

U.S. PATENT DOCUMENTS

| | | | |
|---|---|---|---|
| 3,744,043 A | 7/1973 | Walden et al. | |
| 5,334,974 A | 8/1994 | Simms et al. | |
| 5,870,022 A * | 2/1999 | Kuhnly et al. | 340/567 |
| 6,072,396 A | 6/2000 | Gaukel | |
| 6,166,627 A | 12/2000 | Reeley | |
| 6,225,901 B1 | 5/2001 | Kail, IV | |
| 6,246,320 B1 | 6/2001 | Monroe | |
| 6,441,743 B1 | 8/2002 | Berger | |
| 6,518,889 B2 | 2/2003 | Schlager et al. | |
| 6,608,559 B1 | 8/2003 | Lemelson et al. | |
| 6,847,892 B2 | 1/2005 | Zhou et al. | |
| 6,873,256 B2 | 3/2005 | Lemelson et al. | |
| 6,891,470 B2 * | 5/2005 | Bohinc, Jr. | 340/539.26 |

(Continued)

FOREIGN PATENT DOCUMENTS

CA 2110353 A1 11/1994

(Continued)

OTHER PUBLICATIONS

Richard C. Puetter and Amos Yahil., "The Pixon Method of Image Reconstruction", astro-ph/9901063, Jan. 17, 1999, pp. 1-10, v2.

(Continued)

*Primary Examiner* — Gregory C Issing
(74) *Attorney, Agent, or Firm* — Bereskin & Parr LLP/S.E.N.C.R.L.,s.r.l.

(57) ABSTRACT

A detection system and method having at least one detection unit, and a control center unit.

The detection unit includes at least one sensor configured to generate sensor data correlated to sensed conditions, a locator for actively determining location data corresponding to the location of the detection unit, and a communicator configured to communicate the sensor data and location data.

The control center includes a receiver for receiving the sensor data and the location data, together with a control processor which is configured to determine a threat level correlated to the sensor data.

20 Claims, 7 Drawing Sheets

U.S. PATENT DOCUMENTS

| | | |
|---|---|---|
| 6,956,473 B2 | 10/2005 | Hanood |
| 7,545,269 B2 * | 6/2009 | Craig et al. .............. 340/539.26 |
| 2002/0080138 A1 | 6/2002 | Tarr |
| 2003/0114986 A1 | 6/2003 | Padmanabhan et al. |
| 2004/0041706 A1 | 3/2004 | Stratmoen et al. |
| 2005/0085257 A1 | 4/2005 | Laird et al. |

FOREIGN PATENT DOCUMENTS

| | | |
|---|---|---|
| WO | 01/26068 A1 | 4/2001 |
| WO | 02/44865 A2 | 6/2002 |
| WO | WO 0244865 A2 * | 6/2002 |

OTHER PUBLICATIONS

International Search Report & Written Opinion (Application No. PCT/CA2004/001981), dated Mar. 21, 2005.

Supplementary European Search Report (Application No. 08818375), dated Aug. 20, 2008.

Canadian Office Action (Application No. 2,471,195), dated Jan. 21, 2011.

* cited by examiner

US 8,026,846 B2

MOBILE RADIATION SURVEILLANCE NETWORK

RELATED APPLICATIONS

This application is a continuation of application Ser. No. 11/669,588, filed on Jan. 31, 2007, now abandoned, which is a continuation of application Ser. No. 10/867,643, filed on Jun. 16, 2004, now abandoned. This application also claims priority from U.S. provisional patent application No. 60/520,243 filed on Nov. 17, 2003. All of the above-noted applications are incorporated herein by reference.

FIELD OF THE INVENTION

The present invention relates generally to the field of surveillance systems, with common but by no means exclusive application to systems for detecting nuclear, radiation, chemical or biological conditions in the environment.

BACKGROUND OF THE INVENTION

Since the terrorist events of Sep. 11, 2001, the likelihood of future terrorist attacks is acknowledged to be higher than in the past. As a result, the public has greater expectations for security, prevention, interdiction and incident site management. Radiological and other agents have a particularly high potential for psycho-social impacts on political and economic systems. The malicious dispersal or the clandestine placement of radiological materials or other agents could be used to attack private, public and economic targets.

Radiological, nuclear, biological or chemical agents could be acquired by terrorists through clandestine theft or low level military operations and moved, possibly undetected, to urban population areas or to targets of high symbolic value.

The applicants have accordingly recognized a need for improved systems and methods of detecting and tracking nuclear, radiological, biological or chemical threats.

SUMMARY OF THE INVENTION

In one aspect, the invention is directed towards a detection system having at least one detection unit and a control centre.

The detection unit includes at least one sensor configured to generate sensor data correlated to sensed conditions; a locator for actively determining location data corresponding to the location of the detection unit; and a communicator configured to communicate the sensor data and location data.

The control centre includes a receiver for receiving the sensor data and the location data, and a control processor configured to determine a threat level correlated to the sensor data.

In another aspect, the invention is directed towards a detection unit having at least one sensor, a locator, and a communicator. The sensor is configured to generate sensor data correlated to sensed conditions. The locator is configured to actively determine location data corresponding to the location of the detection unit. The communicator is configured to communicate the sensor data and location data.

In yet another aspect, the invention is directed towards a detection unit comprising at least one sensor, a locator, a control processor and a display unit. The sensor is configured to generate sensor data correlated to sensed conditions. The locator is configured to actively determine location data corresponding to the location of the detection unit. The control processor is operatively coupled to the sensor and to the locator. The display is operatively coupled to the control processor and configured to display graphical data correlated to both the sensor data and the corresponding location data.

In yet a further aspect, the invention is directed towards a method of detecting threatening conditions, comprising the steps of:
a. providing a control centre;
b. providing at least one mobile detection unit, wherein the detection unit comprises at least one sensor configured to generate sensor data correlated to sensed conditions;
c. actively determining location data corresponding to the location of the detection unit;
d. communicating the sensor data and the location data to the control centre;
e. determining a threat level correlated to the sensor data.

Preferably, the method also includes the step of generating a graphical display correlated to both the sensor data and the location data.

BRIEF DESCRIPTION OF THE DRAWINGS

The present invention will now be described, by way of example only, with reference to the following drawings, in which like reference numerals refer to like parts and in which.

DETAILED DESCRIPTION OF THE INVENTION

Figure 1:
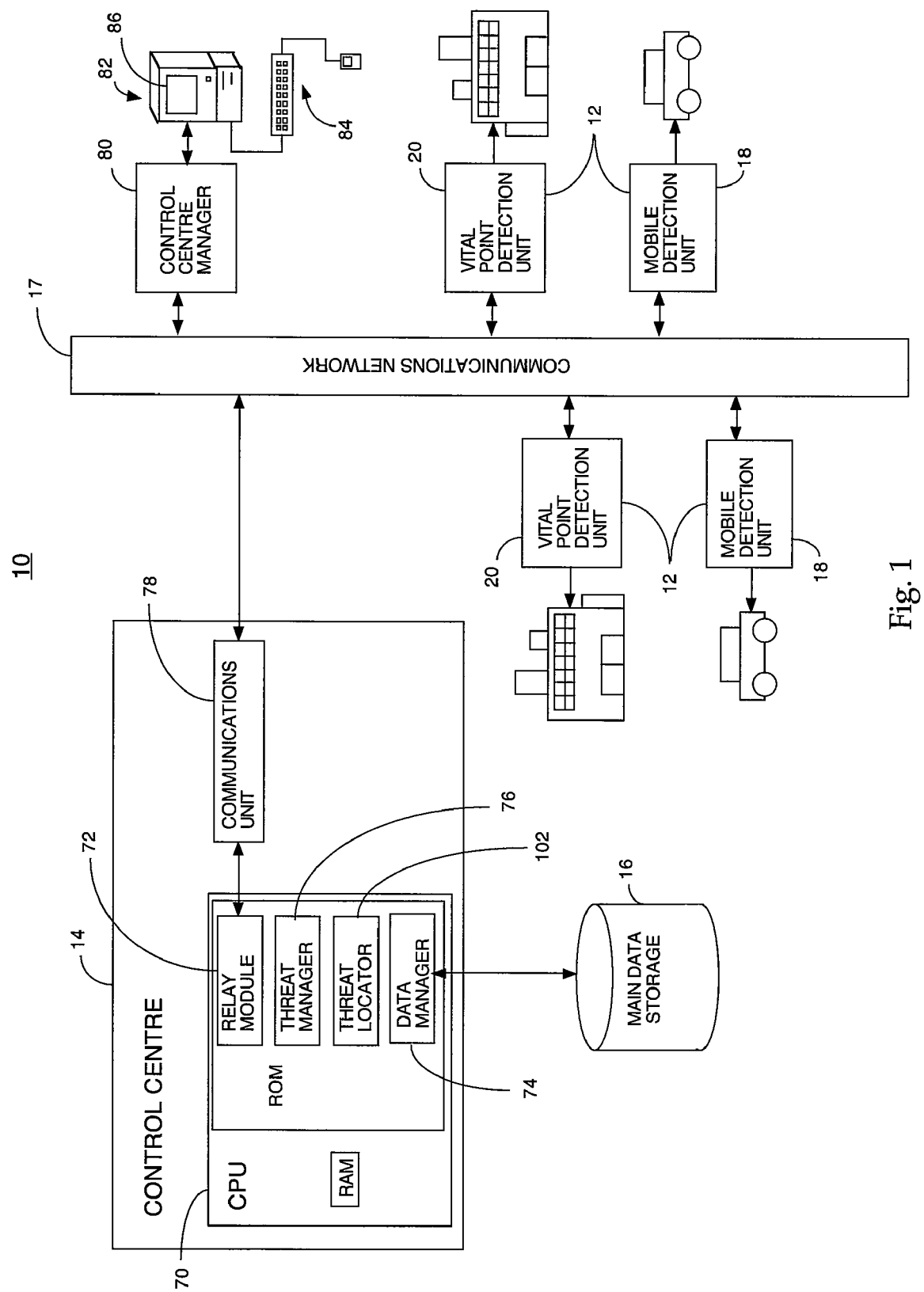
FIG. 1 is a schematic diagram of a detection system made in accordance with the resent invention.

Referring to FIG. 1, illustrated therein is a detection system, referred to generally as 10, made in accordance with the present invention. The detection system 10, typically comprises a plurality of detection units 12, and a control centre 14 and a main data storage unit 16. The detection units 12 and control centre 14 are typically operatively coupled via a communications network 17 such as the internet, a local radio or wired communications network, or cellular communications network, or a combination thereof, which provides a communications link between the units 12 and the centre 14.

The detection units 12 may be of a mobile detection unit type 18 or a stationary vital point detection unit type 20.

Figure 2A:
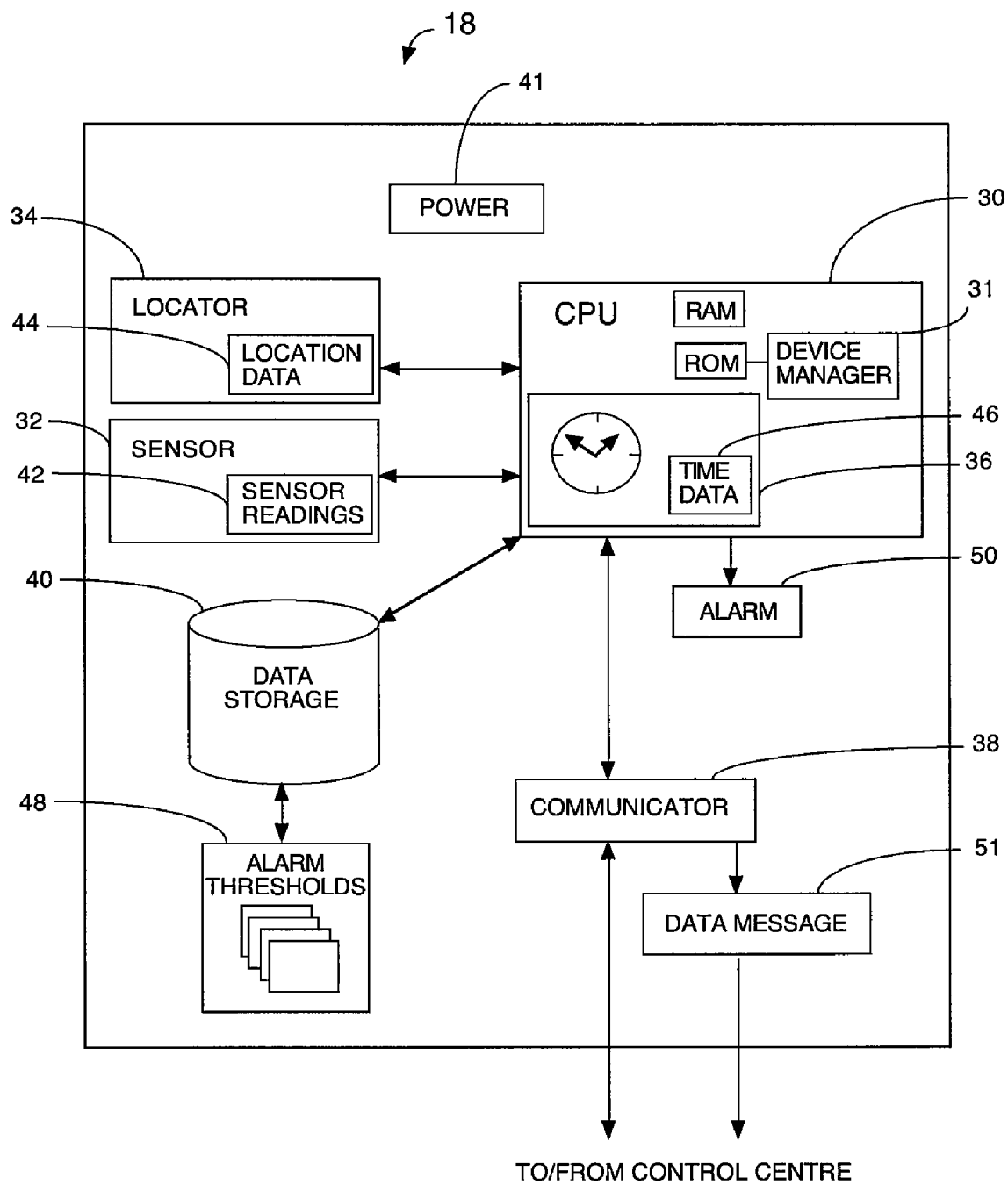
FIG. 2A is a schematic diagram of a mobile detection unit used in connection with the detection system of FIG. 1.

Referring now to FIG. 2A, illustrated therein is a mobile detection unit 18. The mobile detection unit 18 includes a suitably programmed detection unit central processing unit (CPU) 30 comprising random access memory (RAM) and read only memory (ROM) storing device manager software 31. The CPU 30 is operatively coupled to one or more sensors 32, a locator 34, a timer 36, a communicator 38, a detection unit data storage 40, and a power source 41.

Each sensor 32 measures the current level of a potentially harmful agent (eg. radiological, nuclear, chemical or biological) in the immediate environment, and generates corresponding sensor data 42, preferably at specified intervals on a continuous basis while the detection unit 18 is in operation. Such sensors 32 are commercially available, for example, the Eberline 40G series of radiation detectors and the associated family of external radiation detectors are available as off-the-shelf components.

The locator 34 is preferably an active positioning determining device such as a global positioning system (GPS), for example, a Trimble Lassen SQ GPS. However other systems for actively and accurately determining the location of the detection unit 18 may be used, for example such as the LORAN navigation system or other triangulation systems, which generate location data 44 corresponding to the location of the detection unit 18.

The timer 36 may be programmed as part of the processor 30 utilizing the processor's 30 clock functionality, and is configured to generate timing data 46 which corresponds to the time at which each sensor data point 42 is generated. Alternatively, if the locator 34 is a GPS system, the locator 34 could also generate the timing data 46, as will be understood.

The processor 30 receives the sensor data 42, the location data 44 and the timer data 46, and organizes the data 42, 44, 46 and including any error messages into a data message 51. The processor 30 then causes the communicator 38 to communicate the data message 51 (containing the data 42, 44, 46 and any error messages) to the control centre 14 for processing. The communicator 38 will be a wireless data transmitter for example such as a wireless modem or wireless Ethernet device. Preferably, the processor 30 is configured to encrypt the data message 51, and correspondingly, to decrypt any data messages received from the control centre 14.

Typically, the communicator 38 will transmit the data message 51 via radio or cellular transmission. Typically, such a transmission will be received and converted into an internet message for delivery to the control center 14. In the event the communicator 38 is unable to establish or maintain a communications link with the control centre 14, the processor 30 is preferably programmed to store the data 42, 44, 46 and/or the data message 51 in the detection unit data storage 40 for retrieval and communication by the communicator 38 once communications with the control centre 14 have been reestablished.

The detection unit data storage 40 will preferably also store basic alarm threshold data 48, which preferably stores an alarm threshold data point 48 corresponding to a dangerous sensor data level 42. If the sensor 32 generates a sensor reading 42 which exceeds (or is less than as the case may be) the alarm threshold data point 48, the processor 30 will preferably be programmed to trigger a local alarm 50 or otherwise will preferably be programmed to notify the user of the potential danger.

Additionally, the communicator 38 may receive location-based alarm threshold data points 48 from the control centre 14 which it will store in the detection unit data storage 40 (or alternatively in the detection unit's processor 30 RAM storage). The basic and location-based alarm threshold data 48 is stored locally on the detection unit 18 to enable the processor 30 to detect a harmful environment and trigger a local alarm 50 for safety reasons, even when communication with the control centre 14 is interrupted or degraded and the control centre 14 would be unable to trigger such an alarm.

A power source 41 sufficient to power the operation of the detection unit 18 is also provided. The power source 41 preferably includes a rechargeable battery system. In some instances, the detection unit 18 (and correspondingly, the power source 41, which will typically comprise a significant portion of the detection unit's 18 weight) may be configured in size and weight to be easily carried by a person, for example, in a backpack. In such instance, it is expected that such a person could either walk or travel on bike or horseback.

In addition, or in the alternative to a rechargeable battery system, in detection units 18 intended for use with a motor vehicle the power source 41 may include cabling and/or adaptors for connecting the detection unit 18 to the vehicle's electrical system for the supply of electrical power.

In general, each detection unit 12 measures current levels of undesirable agents (ie. chemical, biological, radiological or nuclear), and sends these measurements, coupled with current time and location, to the Control Center 14. The Control Center 14 receives and organizes the data from a network of Detection Units 12.

Figure 2B:
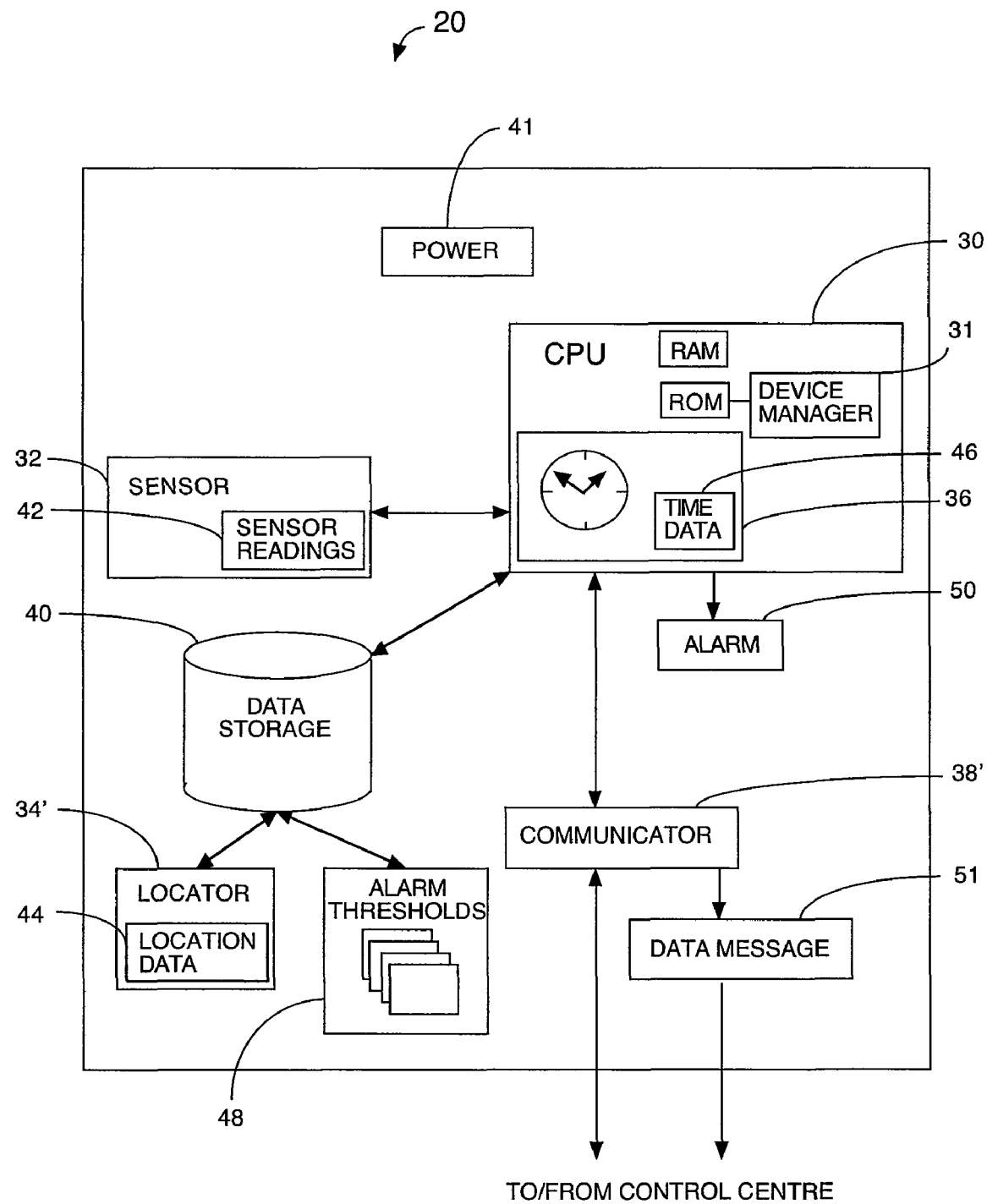
FIG. 2B is a schematic diagram of a vital point detection unit used in connection with the detection system of FIG. 1.

Referring now to FIG. 2B, illustrated therein is a vital point detection unit 20. Vital Point Detection Units 20 (VPDU 20) are statically deployed, and are intended to protect fixed assets. VDPUs 20 are generally similar to the mobile detection units 18. However, because a VPDU's 20 location is static, no GPS-style locator 34 is required. Accordingly, the locator 34' may simply comprise location data 44 corresponding to the location of the VDPU 20 which has been predetermined and stored in the detection unit data storage 40. For the sake of clarity, such a locator 34' is not considered to be active for the purpose of this application.

Additionally, wireless communication is typically not needed in VDPUs 20. Accordingly, the communicator 38' may take the form of a wired communication device, such as a wired Ethernet device. As well, in the case of a VDPU 20, the power supply 41 may include a electrical plug for plugging into a standard wall socket.

Referring again to FIG. 1, the control centre 14 includes three main software components, each of which may be programmed and run on a main control centre CPU 70, or alternatively may be programmed and run on separate, but operatively coupled CPUs: a relay module 72, a data manager 74, a threat manager 76.

Typically, the main data storage unit 16 comprises long term memory and forms part of the control centre 14, although it should be understood that the database 16 may reside locally or be remotely coupled to the control centre 14. The control centre 14 also includes a communications unit 78, typically having both wired and wireless communications devices, such as wireless modems, wired or wireless Ethernet devices, radio or satellite or infrared transmitters and receivers.

The relay module 72 is programmed to manage the communication of data between the communications unit 78 and the communicator 38 of each of the detection units 12. The data manager 74 manages the main data storage unit 16. The data manager 74 provides service to the relay module 72 and the control centre managers 80 (discussed in greater detail below), and allows them to add, retrieve, modify and delete various monitoring information.

The threat manager 76 determines if the sensor data 42 indicates a level of agent that is higher than normal, or in the case of radiation, indicates the presence of a signal that is stronger than background radiation. The threat manager 76 determines a threat level for all sensor data 42 measurements, which is stored with each sensor data measurement 42 in the main data storage unit 16 by the data manager 74. In its simplest embodiment, the threat manager 76 may determine threat level by comparing the sensor measurements 42 to previously determined threshold level data points stored in the main data storage 16.

In a more complicated embodiment, the threat manager 76 determines threat level by analyzing sensor measurements 42, in conjunction with the corresponding location and time when the sensor measurements 42 were taken. The threat manager 76 may also use data from other sensors that measure current weather conditions, and it may allow manual overrides for known and accepted radiation anomalies (such as known transportation of non-illicit material). This calculated threat level is then coupled with the measurement 42, location and time and stored in the main data storage 16 by the data manager 74.

The threat level analysis typically proceeds in four steps. These four signal processing steps are preferably employed continuously throughout the operation of the system 10. This continuous operation allows for improvement in sensitivity and specificity of detection of threat events during the entire operational lifetime of the system 10 through increased statistical precision in characterizing the expected radiation environment. The four steps are set out below.

First, the sensor measurements 42 are associated with a statistical uncertainty. Further, the effects of radiation sensor movement, sensor efficiency of detection, instrumental measurement averaging time, directional sensitivity, and other instrumental factors as may be necessary are accounted for in order to obtain an estimate of the radiation level at a specific location and its uncertainty.

Second, the estimates of the radiation levels and their uncertainties are associated with season of year, time of day, prevailing climatic conditions, and measurements obtained from other sensors such as static radiation sensors. Using these factors the seasonal and temporal variations in the radiation environment may be characterized.

Third, the short term temporal and spatial variations in radiation measurement levels arising from the legitimate movement and placement of radiation sources in the environment are identified by association of radiation measurement data with those radiation sources.

Fourth, anomalous radiation sources both static and moving are characterized by significant deviations from the expected radiation environment as identified by the above three steps. Anomalous radiation sources may differ in such factors as, but not limited to, magnitude of radiation sensor measurement data, velocity, pattern of movement within the environment, temporal variation in radiation measured level and radiation spectrum.

The system 10 provides for the use of conventional signal processing tools to conduct the above four steps. These tools include but are not limited to statistical estimates of errors and uncertainties, statistical tests of significance of association, difference, etc., seasonal factor extraction, temporal and spatial averaging and deconvolution techniques. These tools are typically applied globally to the data set of sensor measurements distributed spatially over the area monitored and temporally over the time span of monitoring.

The present system provides for the capability to employ adaptive alarming levels. First, the important spatial, meteorological and temporal variations within a high value target area and which variations may be as great as ten to one, may be used to provide for deviations of the radiation or other types of sensor measurements relative to the expected levels specific in time and location as determined by routine operation of the present system.

In addition, the system provides for the adjustment of the above relative alarming levels on the basis of a risk/cost/benefit determination. Intelligence estimates of the probability of the perpetration of a radiological, chemical, biological or nuclear attack and other intelligence information from outside the system may be used to dynamically adjust the relative measurement alarming levels. This adaptive alarming operation provides for the more sensitive detection of anomalous events with acceptance of the costs of higher false positive rates in periods of greater perceived risk to the high value target area.

In routine surveillance operation, and in the absence of threatening incidents, the system 10 provides a cost effective means for the assembly of a data set characterizing the normal or expected environment of the area under surveillance with unprecedented spatial resolution, temporal resolution and statistical significance. Moreover the data are reported automatically by autonomous operation of the system leading to the important advantages of reliability, reproducibility, consistency and negligible field operative skill and time requirements.

The detailed understanding and the catalog of the signatures of benign radiation, nuclear, biological and/or chemical measurements resulting from operation of the system 10 provide a basis upon which the identification of the signatures of anomalous and illicit events can be made. This leads to a lower rate of occurrence of undesirable and costly false alarms or false positive indications of illicit events. As well, these features lead to a lower rate of occurance of dangerous and costly failures to alarm in the presence of illicit events or false negative indications of illicit events.

Pixon signal processing tools may instead be used to conduct the above four steps. Pixon signal analysis is discussed for example in Puetter, R. C., and Yahil, A., "The Pixon Method of Image Reconstruction", Proc. ADASS '98, in *Astronomical Data Analysis Software and Systems VIII*, D. M. Mehringer, R. L. Plante, and D. A. Roberts, Ed.s, ASP Conference Series, Vol. 172, pp. 307-316, which is incorporated herein by reference.

These Pixon tools obtain the best estimate of a radiation measurement for example at each specific spatial and temporal point in the set of radiation measurements by modeling the data available in the local neighborhood of that spatial and temporal point. The model developed of the local data is that model which is the simplest possible which is consistent with the statistical uncertainties inherent in the data. The threat manager 76 is also preferably programmed to provide the ability to query the data manager 42 for the stored threat level of each detection unit's 12 latest sensor readings.

The data manager 74 is preferably the only control centre 14 system component that has direct access to the main data storage 16. All operations involving reading, writing, and manipulating data within the main data storage 16 will preferably be performed exclusively by the data manager 74. The data manager 74 provides services to the relay module 72 and to each control centre manager 80 that allow them to add, modify, view, and delete data stored in the main data storage 16.

The data manager 74 controls the storing of sensor data 42, device configuration data, errors, and commands for the detection unit CPUs 30. The data manager 74 will receive the data messages 51 from the relay module 72 and then parse the sensor readings 42, corresponding location and time data, and error messages from the data messages 51 and store them in the main data storage 16.

Figure 3:
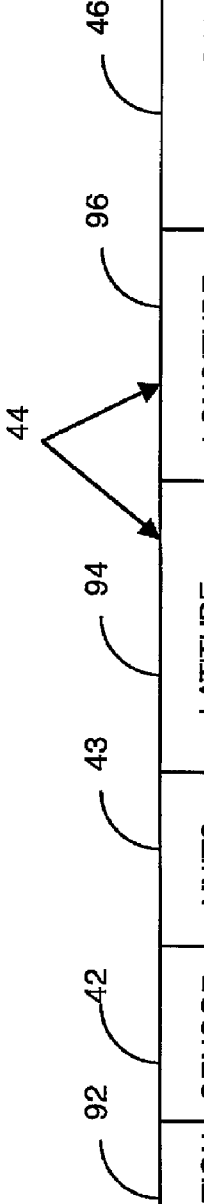
FIG. 3 is a schematic diagram of sample historical sensor reading data stored in the main data storage unit of FIG. 1.

Referring now to FIG. 3, illustrated therein is a representative sample of the type of historical data which may be stored in the main data storage 16. The database 16 contains the detection unit identifier 92, the sensor data 42, units of measurement 43, the location data 44 (latitude 94 and longitude 96) (corresponding to the sensor data 42), and the timer data 46 also corresponding to every reading 42.

The relay module 72 may also be programmed to periodically query the data manager 74 for a list of commands to be sent to the detection unit CPUs 30. The data manager 74 will also store all application preferences and settings data required by the control centre managers 80. The control centre managers 80 may query the data manager 74 for sensor readings 42, and detection unit 12 configuration. In addition each control centre manager 80 will be able to send commands to the detection units 12 and update configuration information.

The relay module 72 captures the data messages 51 in raw data streams from the detection unit CPUs 30 and sends them to the data manager 74. In addition, the relay module 72 has the ability to forward commands from the data manager 74 to the detection unit CPUs 30.

The relay module 72 monitors for incoming socket requests and then forwards them to the data manager 74. The relay module 72 will also periodically poll the data manager 74 for commands that need to be sent to individual detection unit CPUs 30.

The relay module 72 is preferably programmed to accept incoming socket requests from detection units 12.

It will spawn an instance of a "Request Manager" to read the data messages 51 from the detection unit 12. The relay module 72 will ensure that the Request Manager terminates properly.

Once a connection request is detected, the relay module 72 will preferably create a specialized thread, called "Request Manager", for dealing with the device requesting the connection.

The Request Manager thread is capable in running in two modes. In N-bit mode the Request Manager will wait for a data message 51 from a detection unit 12. Once the message 51 has been received, the Request Manager thread will upload available commands to the detection unit 12, then it will close the connection. In Permanent Listen mode the Request Manager thread will always have the connection open to receive new readings from the client detection unit. In this mode the Request Manager thread will periodically check if there are commands available to send to the client device. In Permanent Listen mode, the Request Manager thread will only close the connection when an error is encountered.

The control center 14, also receives requests from each control center manager 80 (a user interface application) to retrieve information. The control center manager 80 will query the data manager 74 for stored radiation readings and detection unit 12 configuration. In addition, the control center manager 80 is able to send commands to the detection units 12 and update configuration information.

Figure 5:
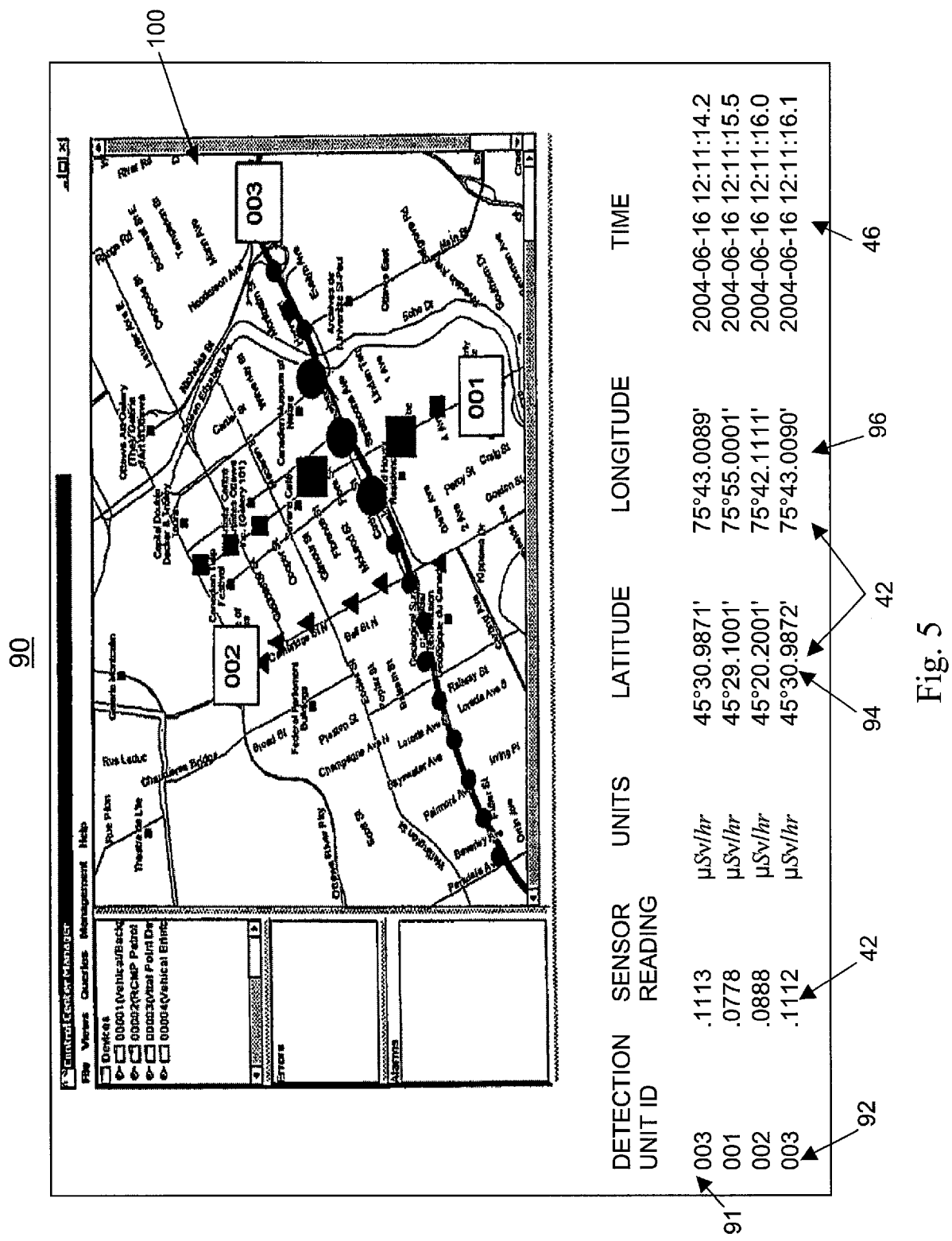
FIG. 5 is a representative screen display of a display unit of FIG. 1.

Typically, each control centre manager 80 is coupled to an input/output device 82, such as a computer having a keyboard 84 and mouse and a display monitor 86 for displaying data to the end users. As discussed below, the input/output device 82 may be a portable device such as a PDA or cellular phone having a display screen. Via the display screen 86, the control centre manager 80 is programmed to display a radiation monitoring screen to the end user. FIG. 5 illustrates a representative example of a radiation monitoring screen 90.

The screen 90 shall display a table 91 of the current radiation readings being displayed on a map 100 which is synchronized with the location data 44 for each of the detection units 12. The table 91 contains the detection unit identifier 92, the location data 44 (latitude 94 and longitude 96), sensor data 42, units of measurement and the timer data 46 for every reading.

The screen 90 also displays a labeled marker or other indicator on the current map 100, showing the location of each of the detection units 12, and indicating each unit's 12 current alarm level. The screen shall display a trail on the current map 100, showing the recent path of each of the detection units 12, and indicating each unit's 12 alarm level at each point on that path. In the example illustrated on FIG. 5, the relative strength of the alarm levels is illustrated by the size of the geometric shapes marking each trail, but colour or other appropriate indicator may be used. In the example illustrated on FIG. 5, three different geometric shapes (circles, squares, triangles) depict the paths of the three different detection units 12. The larger circles and larger squares are intended to illustrate sensor readings 42 which were determined to represent a higher threat level than the sensor readings 42 represented by small squares and small circles.

Every reading that can be located on the selected map 100 is illustrated until it expires (e.g. after 2 minutes or some other selected time limit). If alarms are set, they are illustrated on the map 100 accordingly. The trails indicate past readings.

As noted, the control centre manager 80 is also programmed to provide the user the ability to query the data manager 74 to view historical readings. The display will provide the ability to query for readings, and the ability to query the results.

The control centre manager 80 is programmed with a replay manager which displays a replay of a previous set of data, between two dates/times set by the user, on the display monitor 86. The replay screen should be substantially similar to the monitoring screen 90 illustrated in FIG. 5. The replay should preferably be paused, rewound, and fast forwarded. The replay speed may also preferably be increased several times for speedy viewing.

Illustrated on the replay screen are a slider control, and play, pause, and stop buttons which allow the user to have a media player-like control over the replay. A progress bar within the slider control indicates the progress of the data streaming, as in media player. The replay manager allows the user to select a speed of playback, which can be changed at any time.

The control centre manager 80 is also programmed to allow the user to select a map 100 (or arial photograph or view of a larger map, etc.) on which to view the sensor data 42. This can be changed at any time.

Preferably, the control centre 14 is also programmed with a threat locating module 102. This module 102 is expected to be used when a radiological or nuclear terrorist event has occurred or has been suspected to have occurred.

This threat locating module 102 has access to all historical and current radiation readings and associated times and locations. It will use these data, their associated statistical analyses, and physical modeling of terrorist event scenarios in order to determine estimates of the location, quantity, and isotope of the radiological or nuclear material. It will do this analysis for several scenarios, where each scenario is based on a different assumption of the nature of the source: single stationary location, two stationary locations, single Radiological Dispersal Device (RDD), two RDDs, etc.; single source being transported, two sources being transported, etc.; widely dispersed source (i.e. as a powder, aerosol, etc.).

Additionally, the system 10 provides the benefit and advantage of making available substantially in real time and potentially on a national or international scale the data, information and estimates related to identified or suspected terrorist attacks. This benefit will be of particular advantage during multiple attack events and in soliciting expert opinion from multiple remote jurisdictions.

This analysis would preferably be illustrated graphically, in a manner similar to that of the radiation monitoring screen 90. The user may select the scenario description, and see the probable locations displayed on a map 100. In this manner, the user may see a logical pattern for one or more scenarios, and direct policing authorities and first responders accordingly.

Equipping policing authorities and first responders with displays may prove to be advantageous. The control centre manager interface 80 can easily be run on computers that are common in police cars. However, a portable display would be valuable for pedestrian and equine deployment.

This portable display 82, running on a Personal Digital Assistant (PDA) or on a Wireless Application Protocol (WAP) enabled cell phone, may run the standard control centre manager interface 80, or be programmed to run a special light version of the software.

This light version of control centre manager interface 80 would selectively display information related to the user's own detection unit 12: actual sensor readings 42, current threat level (alarm level), location information 44 (all displayed textually and/or graphically).

Figure 4:
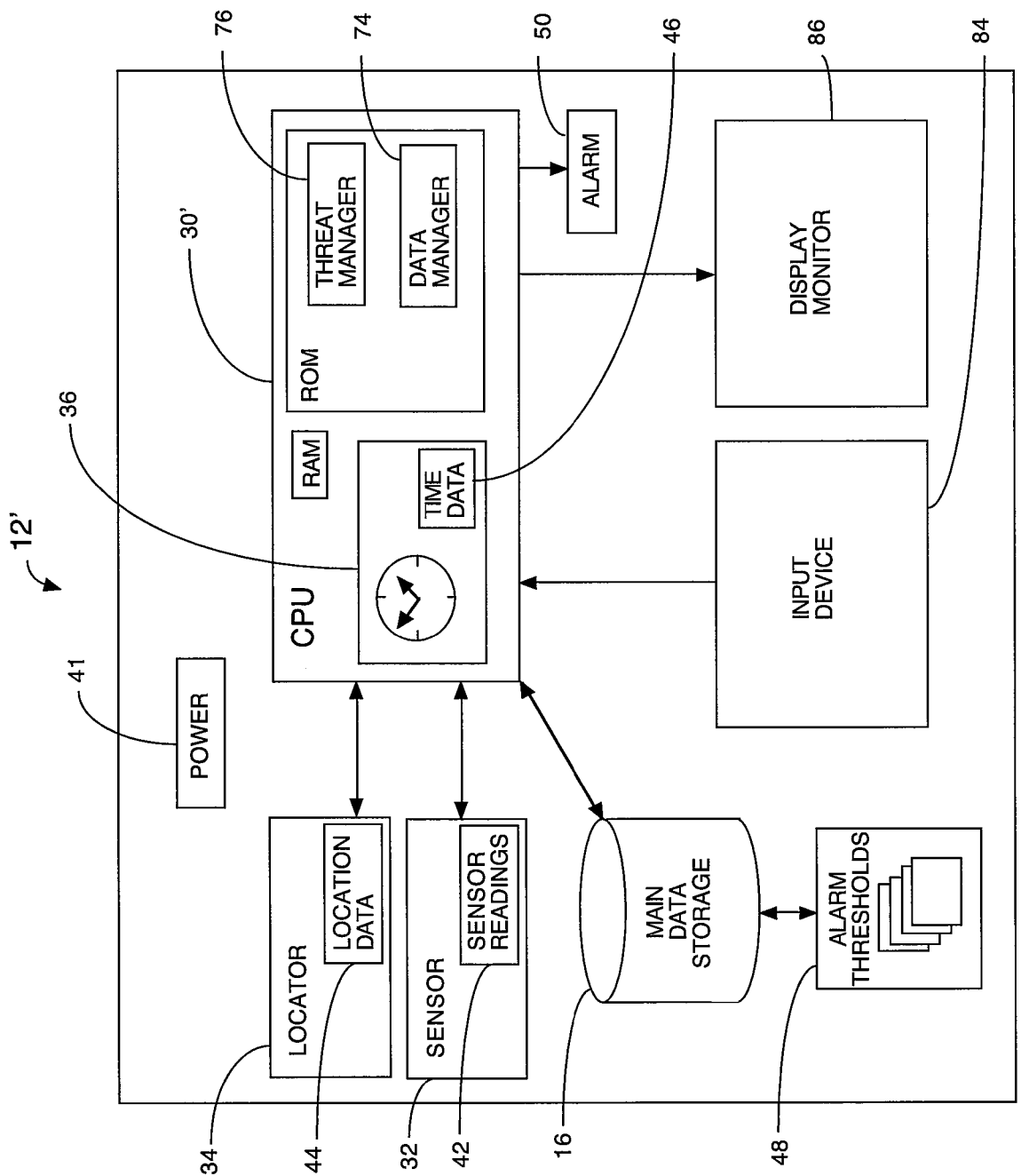
FIG. 4 is a schematic diagram of a stand-alone detection unit made in accordance with the present invention.

Illustrated in FIG. 4 is a schematic diagram of an alternative stand-alone version of the detection unit 12' of the present invention. For cost or other reasons, it may not be feasible for certain applications to have a centralized control centre 14. Accordingly, a single stand-alone detection unit 12' of the present invention may be desired.

As will be understood, the stand-alone detection unit comprises many similar components as that of the mobile detection unit 18, but with the processing capability of the control centre CPU 70, and the greater storage capacity of the main data storage 16. Accordingly, the stand-alone CPU 30' is programmed with the threat manager 76 and the data manager 74 modules. The detection unit 12' is also provided with a display monitor 86 and an input device 84, for example such as a keyboard or touch-sensitive screen, which are operatively coupled to the CPU 30'.

The detection unit 12' will preferably generate a screen display substantially similar to the radiation monitoring screen 90, but as will be understood, will only display the data such as the sensor readings 42 and location data 44 and time data 46 generated by the detection unit 12'.

Figure 6:
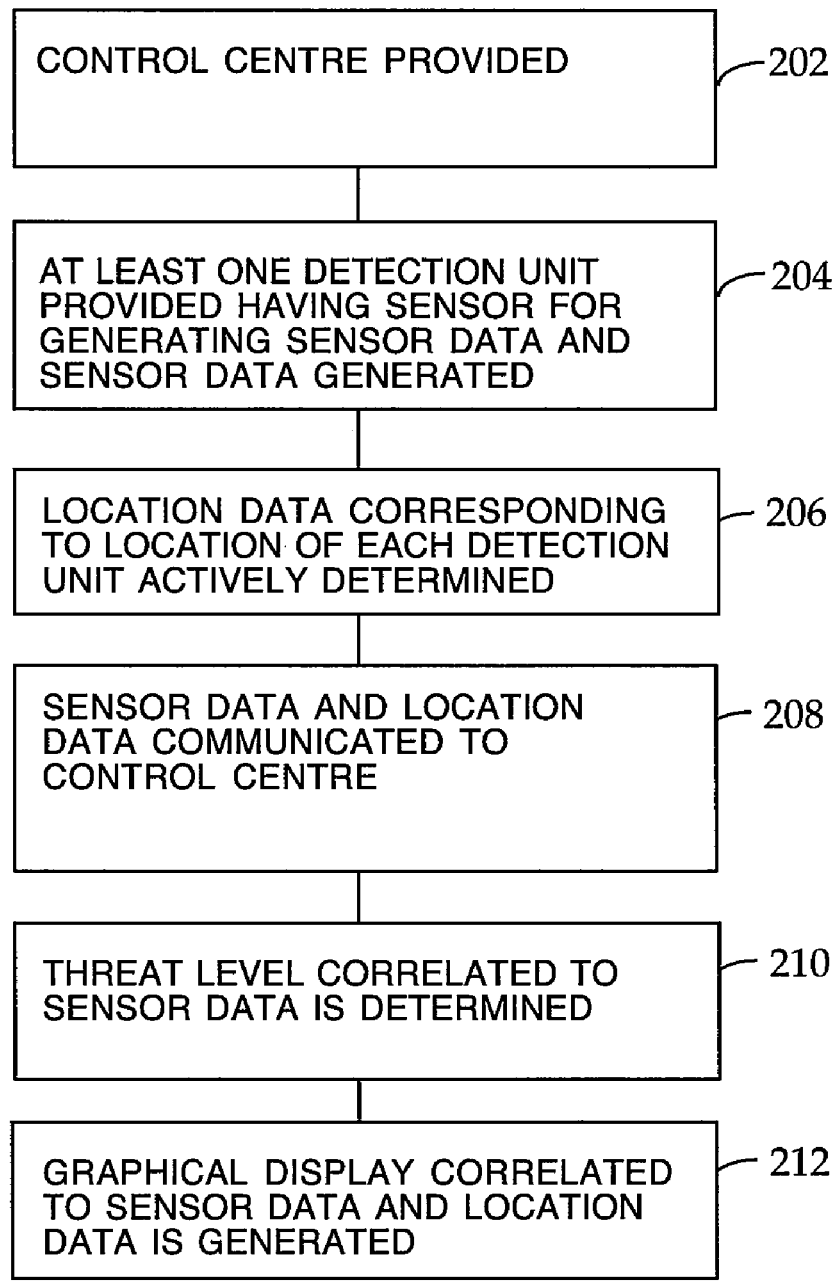
FIG. 6 is a logical flow diagram of a method of the present invention.

Referring now to FIG. 6 (in conjunction with FIGS. 1 and 2A & 2B), illustrated therein is one embodiment of the general process, referred to generally as 200, which the detection system 10 performs. A control centre 14 is provided (Block 202), together with at least one detection unit 12 having a sensor 32 for generating sensor data 42 correlated to sensed conditions (Block 204). Location data 44 corresponding to the location of each detection unit 12 is then actively determined (Block 206). The sensor data 42 and the location data 44 are then communicated to the control centre 14 (Block 208). Next, the data 42, 44 is analyzed and a threat level correlated to the sensor data 42 is determined (Block 210). A graphical display may then be generated which is correlated to both the sensor data 42 and the location data 44.

Thus, while what is shown and described herein constitute preferred embodiments of the subject invention, it should be understood that various changes can be made without departing from the subject invention, the scope of which is defined in the appended claims.

The invention claimed is:

1. A detection system comprising:
   a) at least one detection unit, wherein the detection unit comprises:
      i) at least one sensor configured to generate sensor data correlated to sensed conditions;
      ii) a locator for actively determining location data corresponding to the location of the detection unit; and
      iii) a communicator configured to communicate the sensor data and the location data,
   b) a control centre,
   c) a data storage unit operatively coupled to the control centre and configured to store threshold data, wherein:
      i) the threshold data is correlated to previously stored sensor data and correlated location data; and
      ii) the threshold data comprises at least one data point corresponding to a predetermined threshold level,
   wherein the control centre comprises:
      i) a receiver for receiving the sensor data and the location data;
      ii) a control processor configured to:
         (1) generate, from the sensor data and the threshold data, an alarm correlated to the sensor data and the location data, and
         (2) automatically modify threshold data, correlated to the incoming location data, with incoming sensor data that represents an expected environment.

2. The detection system of claim 1, further comprising a communications network configured to provide a communications link between the communicator and the receiver.

3. The detection system of claim 1, wherein the detection unit further comprises a timer for generating timing data correlated to the time at which the sensor data is generated.

4. The detection system of claim 1, further comprising a monitor operatively coupled to the control processor, wherein the monitor is configured to generate a graphical display correlated to the sensor data and corresponding location data.

5. The detection system of claim 4, wherein the graphical display comprises a map.

6. A method of detecting threatening conditions, comprising the steps of:
   a) providing a control centre;
   b) providing at least one mobile detection unit, wherein the detection unit comprises at least one sensor configured to generate sensor data correlated to sensed conditions;
   c) actively determining location data corresponding to the location of the detection unit;
   d) communicating the sensor data and the location data to the control centre;
   e) providing threshold data correlated to previously stored sensor data and correlated location data;
   f) generating an alarm correlated to the sensor data, from the sensor data generated in step b) in conjunction with the location data determined in step c) and the threshold data provided in step e); and
   g) automatically modifying threshold data in step e), correlated to the incoming location data in step c), with incoming sensor data in step b) that represents an expected environment.

7. The method as claimed in claim 6, further comprising the step of generating a graphical display correlated to both the sensor data and the location data.

8. A detection system comprising:
   a) at least one detection unit, wherein the detection unit comprises:
      i) at least one sensor configured to generate sensor data correlated to sensed conditions;
      ii) locator for actively determining location data corresponding to the location of the detection unit; and
      iii) a communicator configured to communicate the sensor data and the location data,
   b) a control centre, and
   c) a data storage unit operatively coupled to the control centre and configured to store threshold data, wherein the threshold data is correlated to previously stored sensor data and correlated location data,
wherein the control centre comprises:
i) a receiver for receiving the sensor data and the location data; and
ii) a control processor configured to generate, from the sensor data and the threshold data, an alarm correlated to the sensor data and the location data.

9. The detection system of claim 8, further comprising a communications network configured to provide a communications link between the communicator and the receiver.

10. The detection system of claim 8, wherein the detection unit further comprises a timer for generating timing data correlated to the time at which the sensor data is generated.

11. The detection system of claim 8, wherein the threshold data comprises at least one data point corresponding to a predetermined threshold level.

12. The detection system of claim 8, further comprising a monitor operatively coupled to the control processor, wherein the monitor is configured to generate a graphical display correlated to the sensor data and corresponding location data.

13. The detection system of claim 8, wherein the graphical display comprises a map.

14. A detection unit comprising:
a) at least one sensor configured to generate sensor data correlated to sensed conditions;
b) a locator configured to actively determine location data corresponding to the location of the detection unit;
c) a communicator operatively coupled to the sensor and to the locator, and configured to communicate the sensor data and location data;
d) a processor; and
e) a data storage unit operatively coupled to the processor and configured to store threshold data, the threshold data being correlated to previously stored sensor data and correlated location data,
wherein the processor is configured to generate an alarm, from the sensor data and the threshold data.

15. The detection unit of claim 14, further comprising a timer for generating timing data correlated to the time at which the sensor data is generated.

16. The detection unit of claim 14, wherein the threshold data comprises at least one data point corresponding to a predetermined threshold level.

17. The detection unit as claimed in claim 14, wherein the locator comprises a global positioning system.

18. The detection unit as claimed in claim 14, wherein the at least one sensor is configured to sense at least one from the following set of types of agents: chemical, biological, radiological and nuclear.

19. A method of detecting threatening conditions, comprising the steps of:
a) providing a control centre;
b) providing at least one mobile detection unit, wherein the detection unit comprises at least one sensor configured to generate sensor data correlated to sensed conditions;
c) actively determining location data corresponding to the location of the detection unit;
d) communicating the sensor data and the location data to the control centre;
e) providing threshold data correlated to previously stored sensor data and correlated location data; and
f) generating an alarm correlated to the sensor data, from the sensor data generated in step b) in conjunction with the location data determined in step c) and the threshold data provided in step e).

20. The method as claimed in claim 19 further comprising the step of generating a graphical display correlated to both the sensor data and the location data.

* * * * *